(12) United States Patent
Branda et al.

(10) Patent No.: US 7,742,476 B2
(45) Date of Patent: Jun. 22, 2010

(54) SYNCHRONOUS PEER TO PEER DEPLOYED APPLICATION PROPAGATION FOR LARGE CLUSTERS

(75) Inventors: Steven J. Branda, Rochester, MN (US); Robert V. Geiner, Raleigh, NC (US); John J. Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 11/462,462

(22) Filed: Aug. 4, 2006

(65) Prior Publication Data

US 2008/0123643 A1 May 29, 2008

(51) Int. Cl.
*H04L 12/28* (2006.01)

(52) U.S. Cl. ............... 370/390; 370/544; 370/447; 370/235; 709/233

(58) Field of Classification Search ........... 370/447, 370/449, 450, 544, 390, 229, 231–235, 253; 709/231
See application file for complete search history.

(56) References Cited

U.S. PATENT DOCUMENTS

| | | | |
|---|---|---|---|
| 5,408,465 A * | 4/1995 | Gusella et al. ............. | 370/231 |
| 6,738,870 B2 | 5/2004 | Van Huben et al. | |
| 6,738,872 B2 | 5/2004 | Van Huben et al. | |
| 6,772,415 B1 | 8/2004 | Danckaert et al. | |
| 6,959,320 B2 | 10/2005 | Shah et al. | |
| 2003/0051051 A1 * | 3/2003 | O'Neal et al. ............. | 709/242 |

OTHER PUBLICATIONS

Denko, M.K., "The use of Mobile Agents for Clustering in Mobile Ad Hoc Networks", Proceedings of SAICSIT 2003, pp. 241-247.
Tang, H. et al., "A Self-Organizing Storage Cluster for Parallel Data-Intensive Applications", Publication of IEEE # 0-7695-2153-3/04, 2004, pp. 1-13.
Saxena, N. et al, "Admission Control in Peer-to-Peer: Design and Performance Evaluation", Proceedings of the $1^{st}$ ACM Workshop Security of Ad Hoc and Sensor Networks Fairfax, Virginia, 2003 ACM-1-58113-783-4/03/0010, pp. 104-114.

* cited by examiner

*Primary Examiner*—Chi H Pham
*Assistant Examiner*—Kouroush Mohebbi
(74) *Attorney, Agent, or Firm*—Lee Law, PLLC; Christopher B. Lee

(57) ABSTRACT

The present invention a synchronous peer to peer transfer model that utilizes all available network bandwidth to deploy application code to an entire cluster as fast as it can be sent to one machine. A method in accordance with an embodiment of the present invention includes: determining a number N of simultaneous connections that should be opened to the cluster members to maximize network bandwidth; and synchronously deploying the application to the cluster members using the N simultaneous connections.

20 Claims, 3 Drawing Sheets

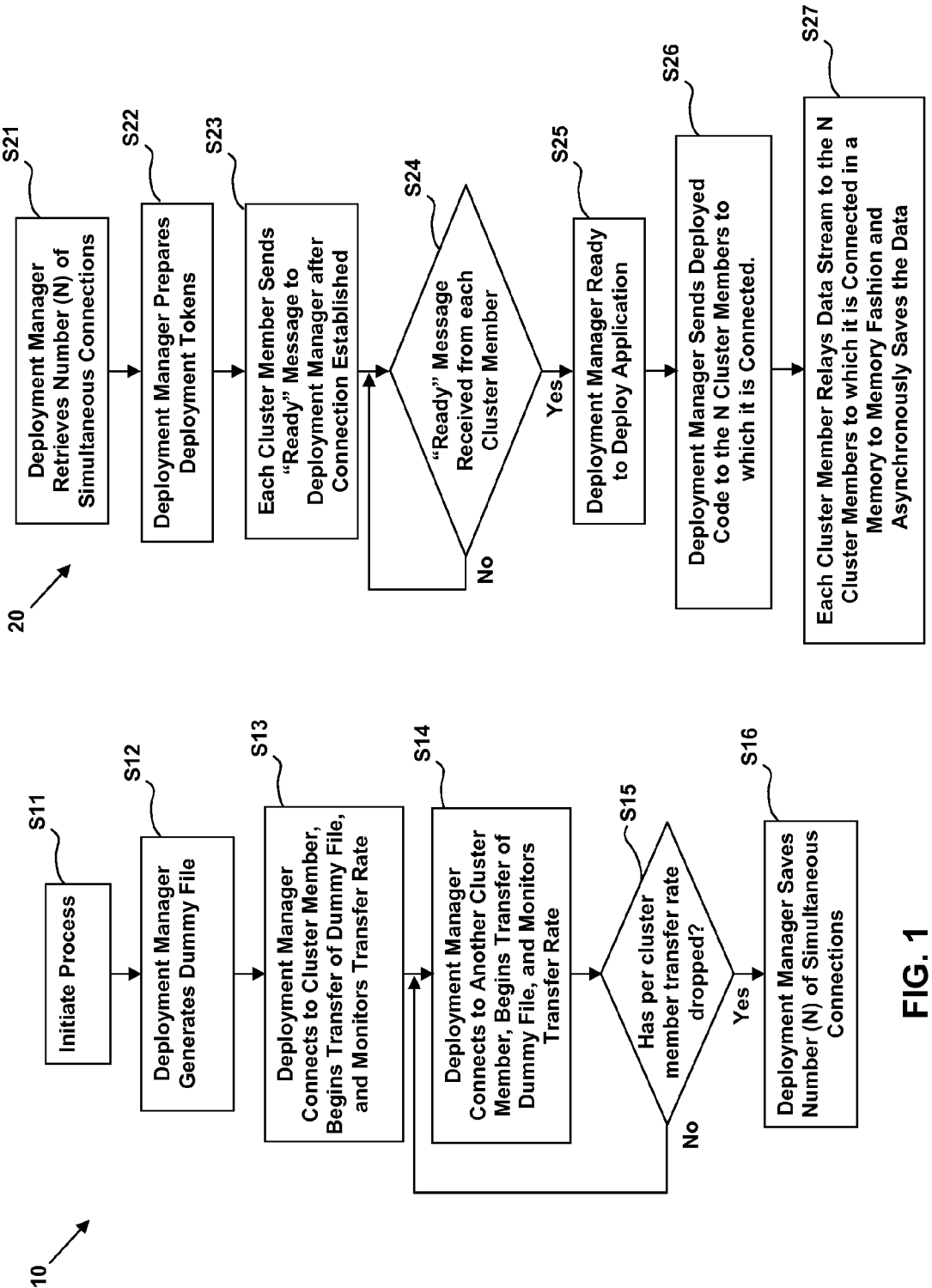

SYNCHRONOUS PEER TO PEER DEPLOYED APPLICATION PROPAGATION FOR LARGE CLUSTERS

BACKGROUND OF THE INVENTION

1. Field of the Invention

The present invention generally relates to data transfer, and more specifically relates to synchronous peer to peer deployed application propagation for large clusters.

2. Related Art

One method for deploying a Java 2 Platform, Enterprise Edition (J2EE) application (Java and all Java-based trademarks are trademarks of Sun Microsystems, Inc. in the United States, other countries, or both) to a cluster of machines (e.g., a WebSphere cluster) includes:

1) A deployment manager runs deployment tools on the application and generates deployed code; and 2. The deployment manager transfers the deployed code to the cluster members in parallel.

Because deployed applications can be very large, network bandwidth (even on a 1 gigabyte (GB) network) will quickly become a bottleneck. Once the network bandwidth of the deployment manager is exhausted, the application deploy time to the cluster will increase linearly (or worse) with the number of cluster members.

As an example, for a 1331 MB application deployed to 450 cluster members via a GB network:

1 GB network bandwidth=125 megabytes (MB)/sec; and
Hard disk (HD) limited transfer rate=25 MB/sec.

After the first 5 connections, bandwidth decreases linearly with each additional cluster member:

Deployment speed=(125 MB/sec)/445 cluster members=0.28 MB/sec; and

Total deployment time=1331 MB/0.28 MB/sec=4750 seconds=79 minutes.

Thus, it will take 79 minutes to deploy the application to each member of the cluster.

One solution customers have to this problem is to invest in expensive network upgrades that are typically unnecessary for their day to day needs. Another, software-based solution is to use a peer to peer downloader. This type of program is designed to catalog, search and download files asynchronously from a peer to peer network, often downloading parts of a file from several different machines in order to maximize download speed. The process is asynchronous, because a file must be completely downloaded to a node before it can be sent out from that node, which limits the speed at which downloads can occur.

SUMMARY OF THE INVENTION

The present invention provides a synchronous peer to peer transfer model that utilizes all available network bandwidth to deploy application code to an entire cluster as fast as it can be sent to one machine. The synchronous peer to peer transfer model includes two parts. The first part determines the number of simultaneous connections that should be opened by a deployment manager to maximize network bandwidth. This is done using a dummy file. The second part synchronously deploys an application to the cluster using the simultaneous connections opened by the deployment manager.

A first aspect of the present invention is directed to a method for deploying an application to members of a cluster, comprising: determining a number N of simultaneous connections that should be opened to the cluster members to maximize network bandwidth; and synchronously deploying the application to the cluster members using the N simultaneous connections.

A second aspect of the present invention is directed to a system for deploying an application to members of a cluster, comprising: a system for determining a number N of simultaneous connections that should be opened to the cluster members to maximize network bandwidth; and a system for synchronously deploying the application to the cluster members using the N simultaneous connections.

A third aspect of the present invention is directed to a program product stored on a computer readable medium for deploying an application to members of a cluster, the computer readable medium comprising program code for: determining a number N of simultaneous connections that should be opened to the cluster members to maximize network bandwidth; and synchronously deploying the application to the cluster members using the N simultaneous connections.

A fourth aspect of the present invention is directed to a method for deploying a program for deploying an application to members of a cluster, comprising: providing a computer infrastructure being operable to: determine a number N of simultaneous connections that should be opened to the cluster members to maximize network bandwidth; and synchronously deploy the application to the cluster members using the N simultaneous connections.

The illustrative aspects of the present invention are designed to solve the problems herein described and other problems not discussed

BRIEF DESCRIPTION OF THE DRAWINGS

These and other features of this invention will be more readily understood from the following detailed description of the various aspects of the invention taken in conjunction with the accompanying drawings in which:

FIG. 1 depicts a flow diagram of an illustrative process carried out by a deployment manager to determine the number of simultaneous connections that should be opened to maximize network bandwidth, in accordance with an embodiment of the present invention.

FIG. 2 depicts a flow diagram of an illustrative process carried out by the deployment manager to deploy an application to each member of the cluster, in accordance with an embodiment of the present invention.

Figure 3:
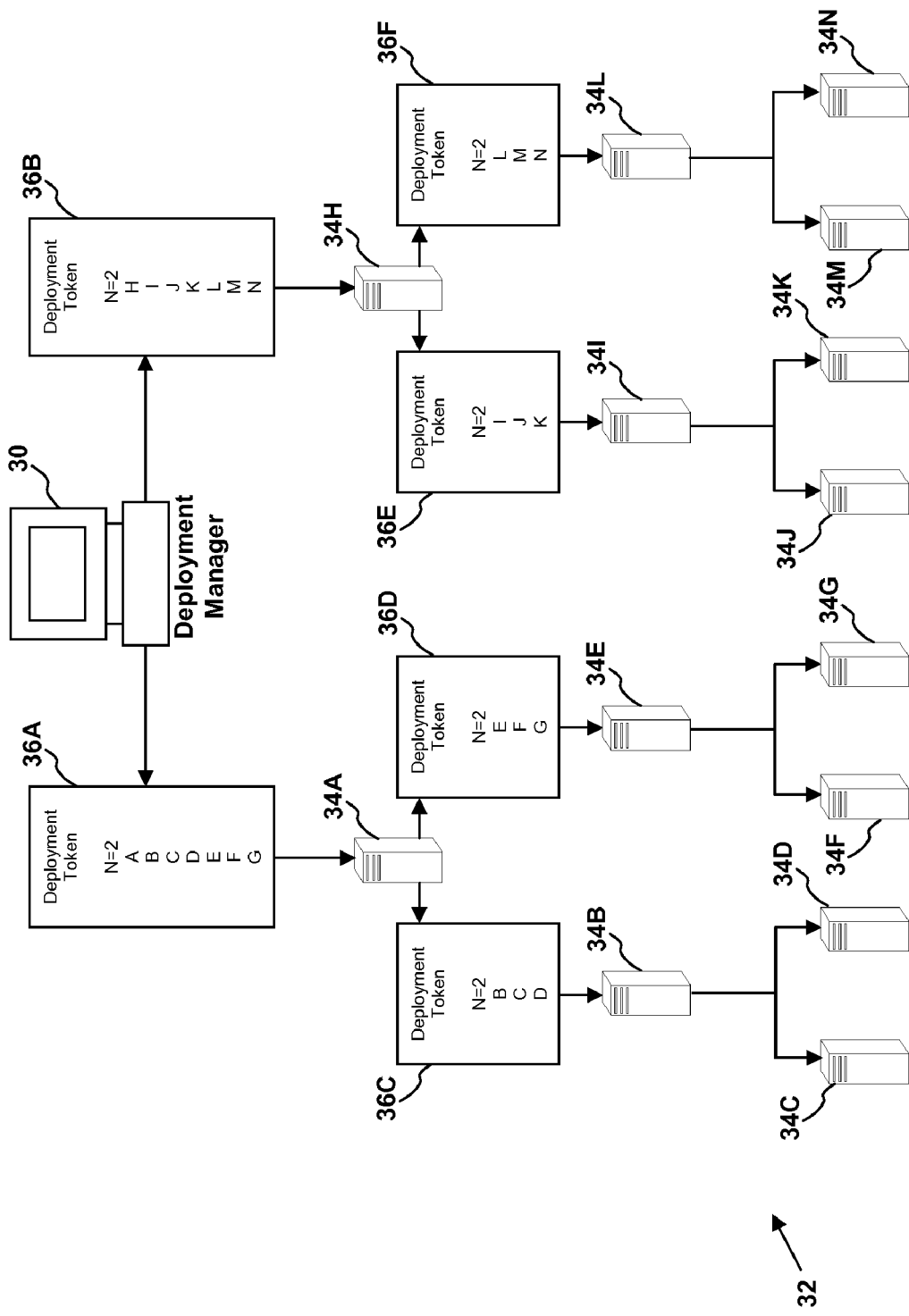
FIG. 3 depicts an illustrative process for preparing and communicating deployment tokens to the cluster members of a cluster in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As stated above, the present invention provides a synchronous peer to peer transfer model that utilizes all available network bandwidth to deploy application code to an entire cluster as fast as it can be sent to one machine. The synchronous peer to peer transfer model includes two parts. The first part determines the number of simultaneous connections that should be opened by a deployment manager to maximize network bandwidth. This is done using a dummy file. The second part synchronously deploys an application to the cluster using the simultaneous connections opened by the deployment manager. The present invention takes advantage of the full duplex and dedicated bandwidth abilities of the switched network interconnecting the cluster members.

Referring now to the drawings, FIG. 1 depicts a flow diagram 10 of an illustrative process carried out by a deployment manager to determine the number of simultaneous connections that should be opened to maximize network bandwidth. In step S11, the process is initiated by a user. In response, in step S12, the deployment manager generates a dummy file on its hard disk. In step S13, the deployment manager connects to one member of the cluster and begins to transfer the dummy file, monitoring the transfer rate on that connection. In step S14, the deployment manager connects to another member of the cluster and begins to transfer the dummy file, again monitoring the transfer rate on that connection. Step S14 is repeated until it is determined by the deployment manager in step S15 that the per cluster member transfer rate has dropped. The number of connections made by the deployment manager in Step S14 is the number (N) of simultaneous connections that should be opened to maximize network bandwidth. This number, which should remain static, is a function of hard disk access and network bandwidth, and is saved in a configuration file of the deployment manager in step S16.

FIG. 2 depicts a flow diagram 20 illustrating a process carried out by the deployment manager to deploy an application to each member of the cluster. In Step S21, the deployment manager retrieves from its configuration file the number of simultaneous connections (N) that should be opened to maximize network bandwidth. In step S22, the deployment manager prepares a "deployment token" for each member of the cluster it will connect to.

With reference to FIG. 3, which depicts a deployment manager 30 and an illustrative cluster 32 having cluster members 34A, 34B, 34C, . . . , 34N, the deployment tokens are prepared as follows:

(A) Split cluster members into N parts. In this example, N is equal to 2. This means that data can be transferred simultaneously at maximum speed to 2 cluster members before exhausting network bandwidth.

(B) Generate N deployment tokens 36A, 36B. The value N and a listing of the cluster members in each part are packaged in a respective deployment token 36A, 36B. In this example, the deployment token 36A includes the value N=2 and a list including the cluster members 34A, 34B, 34C, . . . , 34G, while the deployment token 36B includes the value N=2 and a list including the cluster members 34H, 34I, 34J, . . . , 34N.

(C) The deployment manager 30 opens a connection to the first cluster member 34A, 34H on the list in each deployment token 36A, 36B, respectively, and sends out the deployment token 36A, 36B over the connection.

(D) Upon receipt of the deployment tokens 36A, 36B, the cluster members 34A, 34H remove themselves from the listing of cluster members in the deployment tokens 36A, 36B, respectively, and split the remaining listed cluster members into N parts (if there ≦N cluster members left, skip (E) and (F) and connect to the N cluster members).

(E) Cluster member 34A generates N deployment tokens 3C, 36D and cluster member 34H generates N deployment tokens 36E, 36F. The value N and a listing of the cluster members in each part are packaged in a respective deployment token. In this example, the deployment token 36C includes the value N=2 and a list including the cluster members 34B, 34C, 34D, the deployment token 36D includes the value N=2 and a list including the cluster members 34E, 34F, 34G, the deployment token 36E includes the value N=2 and a list including the cluster members 34I, 34J, 34K, and the deployment token 36F includes the value N=2 and a list including the cluster members 34L, 34M, 34N.

(F) The cluster member 34A opens a connection to the first cluster member 34B, 34E on the list in the deployment tokens 36C, 36D, respectively, and sends out the deployment tokens 36C, 36D, respectively. Similarly, the cluster member 34H opens a connection to the first cluster member 34I, 34L on the list in the deployment tokens 36E, 36F, respectively, and sends out the deployment tokens 36E, 36F, respectively.

(G) This above process is repeated until the entire cluster 30 is processed. In this way, the entire cluster 30 is connected as a tree.

Returning now to FIG. 2, in step S23, each cluster member sends a "ready" message to the deployment manager after a connection has been successfully established using the above process. After the deployment manager has received a ready message from each cluster member (step S24), the deployment manager is ready to deploy the application in step S25.

In step S26, the deployment manager sends the deployed code out to the N cluster members to which it is connected. In the example shown in FIG. 3, for instance, the deployment manager 30 sends the deployed code to the cluster members 34A, 34H. In step 27, as the deployed code is received from the deployment manager, each cluster member does the following:

A) Relays the data stream out to the N cluster members to which it is connected in a memory to memory fashion, eliminating hard disk delays. In the example shown in FIG. 3, for instance, the cluster member 34A relays the data stream to the cluster members 34B, 34E in a memory to memory fashion, while the cluster member 34H relays the data stream to the cluster members 34I, 34L in a memory to memory fashion.

B) Asynchronously saves the data to its hard disk. To this extent, time is not wasted by waiting for a disk write before sending the data back out to other cluster members.

This process is repeated until the deployed code is received by all of the cluster members. In the example shown in FIG. 3, for instance, processing ends after the deployed code has been received in its entirety by the cluster members 34C, 34D, 34F, 34G, 34J, 34K, 34M, 34N located at the bottom of the tree.

Given the same scenario discussed above, which comprises a 1331 MB application deployed to 450 cluster members via a GB network, wherein the network bandwidth is 125 MB/sec and the HD limited transfer rate of the deployment manager is 25 MB/sec, the total data transfer rate is now:

Total data transfer rate=1331 MB/25 MB/sec=53 seconds (89 times faster than the above-described prior art example)

To this extent, the total data transfer rate is governed only by the HD limited transfer rate of the hard disk of the deployment manager.

In accordance with the present invention, data is relayed across the cluster in a synchronous fashion. Currently, many processes propagate files in a tree-like manner, like internet worms, file mirroring servers, peer to peer file sharing programs, etc. However, this is done asynchronously, which forces one node to completely receive a file before sending it to another. By building the whole tree before starting the data transfer, as provided by the present invention, data can be propagated from a node before the whole file is downloaded and at the maximum speed the network will allow. Further, by optimizing the number of outgoing connections per node, the entire tree structure is optimized for the specific cluster.

The present invention forms a "deployment tree" as shown, for example, in FIG. 3, via deployment tokens. To this extent, nodes can propagate tokens in parallel, so it only takes 4 iterations to create connections to every server in the cluster depicted in FIG. 3.

Data is relayed between cluster members in a memory to memory fashion. This would be difficult to do without establishing the whole tree first, because at 25 megabytes per second, a connection delay or failure would probably force data to be buffered on the hard disk. This would slow down the data transfer because it would require a disk write and then a read before sending the data. This is avoided using the present invention.

Figure 4:
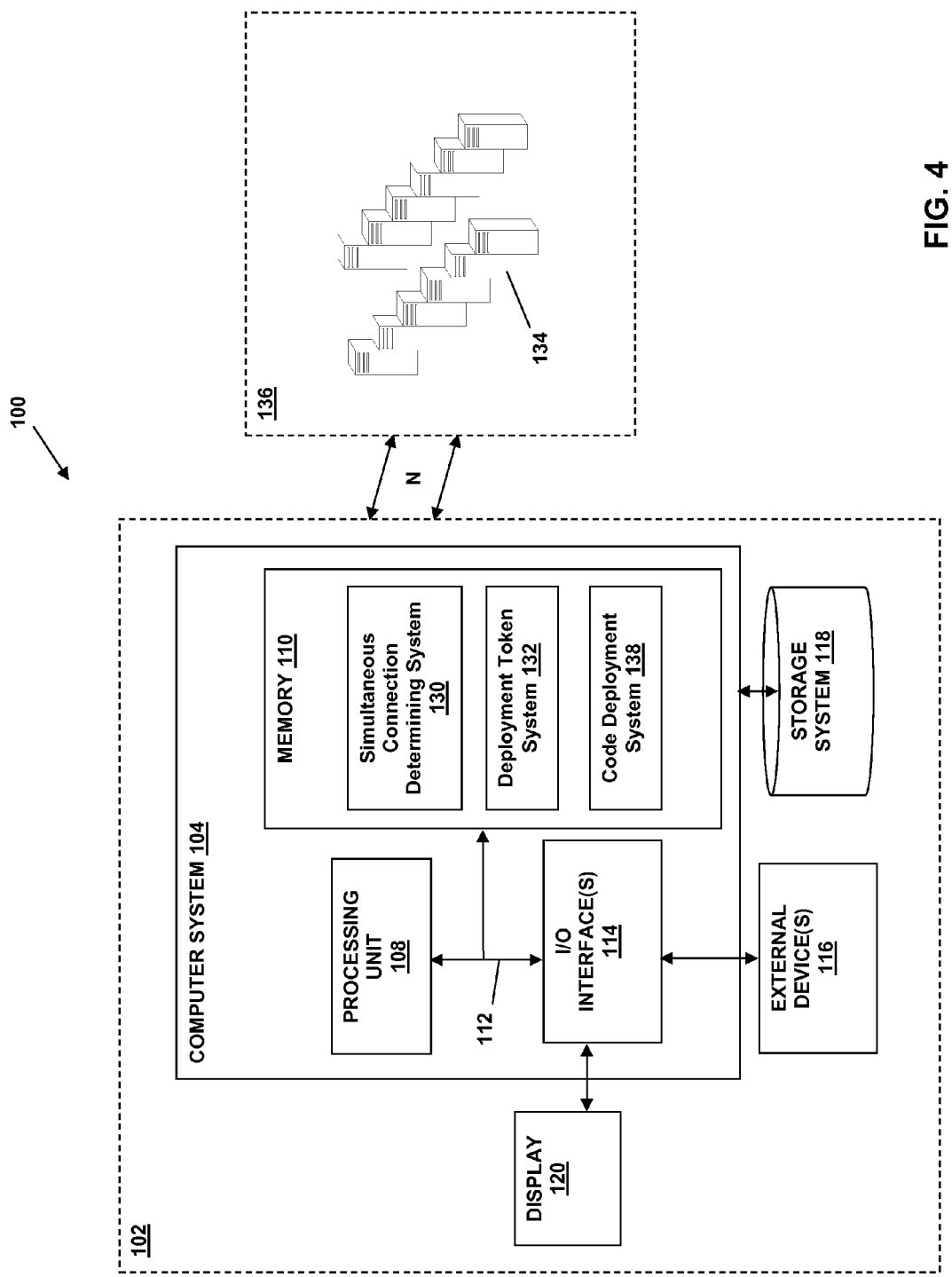
FIG. 4 depicts an illustrative computer system for implementing embodiment(s) of the present invention.

FIG. 4 shows an illustrative system 100 in accordance with embodiment(s) of the present invention. The system 100 includes a computer infrastructure 102 that can perform the various process steps described herein. The computer infrastructure 102 is shown including a computer system 104 that operates as a deployment manager, as described above. The computer system 104 includes a simultaneous connection determining system 130 for determining the maximum number N of simultaneous connections (N) that should be opened to maximize network bandwidth, a deployment token system 132 for preparing and sending out deployment tokens to N members 134 of a cluster 136, and a code deployment system 138 for deploying application code to the N members 134 of the cluster 136.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user (not shown) to interact with the computer system 104 or any device that enables the computer system 104 to communicate with one or more other computer systems. Each member 134 of the cluster 136 can include a similar configuration of components. Each member 134 of the cluster 136 further includes its own deployment token system and code deployment system and operates as described above.

In any event, the computer system 104 can comprise any general purpose computing article of manufacture capable of executing computer program code installed by a user (e.g., a personal computer, server, handheld device, etc.). However, it is understood that the computer system 104 and the is only representative of various possible computer systems that may perform the various process steps of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in one embodiment, the computer infrastructure 102 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 4 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in one embodiment, the invention provides a computer-readable medium that includes computer program code to enable a computer infrastructure to carry out and/or implement the various process steps of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. A service provider can create, maintain, support, etc., a computer infrastructure, such as the computer infrastructure 102, that performs the process steps of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for synchronously deploying an application to members of a cluster, comprising:
   determining, by simultaneously sending a dummy file to an increasing number of cluster members, a maximum number N of simultaneous connections that should be opened to the cluster members to maximize network bandwidth, wherein determining the maximum number N of simultaneous connections comprises:
   (a) connecting to a first cluster member;
   (b) beginning transfer of the dummy file to the first cluster member;
   (c) monitoring a transfer rate of the dummy file to the first cluster member;
   (d) connecting to an additional cluster member;
   (e) beginning transfer of the dummy file to the additional cluster member;
   (f) monitoring the transfer rate of the dummy file to the additional cluster member;
   (g) determining whether a transfer rate of the dummy file to any of the connected cluster members has dropped;
   repeating, if necessary, (d)-(g) until a drop in the transfer rate of the dummy file to any of the connected cluster members occurs; and
   setting N equal to the number of connected cluster members prior to the occurrence of the drop in the transfer rate;
   managing the cluster to establish N different groups of open simultaneous connections among N groups of different cluster members; and
   synchronously deploying the application to the cluster members using the N different groups of open simultaneous connections.

2. The method of claim 1, where managing the cluster to establish the N different groups of open simultaneous connections among the N groups of different cluster members comprises:
   splitting the cluster members into the N groups of different cluster members, wherein each of the cluster members is in one of the N groups;
   generating N deployment tokens, wherein each deployment token comprises the value N and a list of the different cluster members within a different one of the N groups;
   opening a plurality of connections, where the plurality of connections comprises an opened connection to a first cluster member in each of the N groups; and
   sending the deployment token associated with each of the N groups to the first cluster member within each of the N groups via the opened connection to the first cluster member in each group.

3. The method of claim 2, further comprising:
   connecting the cluster members in a tree using the N deployment tokens.

4. The method of claim 3, further comprising:
   synchronously deploying the application to the cluster members in accordance with the tree.

5. The method of claim 2, further comprising:
   receiving a ready message from each cluster member indicating that an opened connection has been successfully established for each cluster member; and
   where synchronously deploying the application to the cluster members using the N different groups of open simultaneous connections is performed in response to receiving the ready message from each cluster member.

6. The method of claim 5, where sending the deployment token associated with each of the N groups to the first cluster member within each of the N groups via the opened connection to the first cluster member in each group comprises causing, in response to receiving one of the N deployment tokens, each of the first cluster member within each of the N groups to:
   remove the first cluster member from the list of the different cluster members in the group;
   split remaining cluster members of the list of the different cluster members in the group into N new groups;
   generate N new deployment tokens, wherein each new deployment token comprises the value N and a list of the remaining cluster members within a different one of the N new groups;
   open an additional plurality of connections as part of the N different groups of open simultaneous connections, where the additional plurality of connections comprises an opened connection to a first cluster member in each of the N new groups; and
   send the new deployment token associated with each of the N new groups to the first cluster member within each of the N new groups via one connection of the N different groups of open simultaneous connections to connect the cluster members in a tree using the N new deployment tokens.

7. The method of claim 1, wherein the application is deployed between cluster members in a memory to memory fashion.

8. A system for synchronously deploying an application to members of a cluster, comprising:
   a deployment computing device configured to:
   determine, by simultaneously sending a dummy file to an increasing number of cluster members, a maximum number N of simultaneous connections that should be opened to the cluster members to maximize network bandwidth, wherein, in being configured to determine the maximum number N of simultaneous connections, the deployment computing device is configured to:
   (a) connect to a first cluster member;
   (b) begin transfer of the dummy file to the first cluster member;
   (c) monitor a transfer rate of the dummy file to the first cluster member;
   (d) connect to an additional cluster member;
   (e) begin transfer of the dummy file to the additional cluster member;
   (f) monitor the transfer rate of the dummy file to the additional cluster member;
   (g) determine whether a transfer rate of the dummy file to any of the connected cluster members has dropped;

repeat, if necessary, (d)-(g) until a drop in the transfer rate of the dummy file to any of the connected cluster members occurs; and set N equal to the number of connected cluster members prior to the occurrence of the drop in the transfer rate;

manage the cluster to establish N different groups of open simultaneous connections among N groups of different cluster members; and synchronously deploy the application to the cluster members using the N different groups of open simultaneous connections.

9. The system of claim 8, where, in being configured to manage the cluster to establish the N different groups of open simultaneous connections among the N groups of different cluster members, the deployment computing device is configured to:

split the cluster members into N groups of different cluster members, wherein each of the cluster members is in one of the N groups;

generate N deployment tokens, wherein each deployment token comprises the value N and a list of the different cluster members within a different one of the N groups;

open a plurality of connections, where the plurality of connections comprises an opened connection to a first cluster member in each of the N groups; and send the deployment token associated with each of the N groups to the first cluster member within each of the N groups via the opened connection to the first cluster member in each group.

10. The system of claim 9, where the deployment computing device is further configured to:

connect the cluster members in a tree using the N deployment tokens.

11. The system of claim 10, where the deployment computing device is further configured to:

synchronously deploy the application to the cluster members in accordance with the tree.

12. The system of claim 8, wherein the application is deployed between cluster members in a memory to memory fashion.

13. The system of claim 8, where the deployment computing device is further configured to:

receive a ready message from each cluster member indicating that an opened connection has been successfully established for each cluster member; and where, in being configured to synchronously deploy the application to the cluster members using the N different groups of open simultaneous connections, the deployment computing device is configured to deploy the application to the cluster members using the N different groups of open simultaneous connections in response to receiving the ready message from each cluster member.

14. A program product stored on a non-transitory computer readable medium for synchronously deploying an application to members of a cluster, the computer readable medium comprising program code for:

determining, by simultaneously sending a dummy file to an increasing number of cluster members, a maximum number N of simultaneous connections that should be opened to the cluster members to maximize network bandwidth, wherein determining the maximum number N of simultaneous connections comprises:

(a) connecting to a first cluster member;
(b) beginning transfer of the dummy file to the first cluster member;
(c) monitoring a transfer rate of the dummy file to the first cluster member;
(d) connecting to an additional cluster member;
(e) beginning transfer of the dummy file to the additional cluster member;
(f) determining the transfer rate of the dummy file to the additional cluster member;
(g) determining whether a transfer rate of the dummy file to any of the connected cluster members has dropped;

repeating, if necessary, (d)-(g) until a drop in the transfer rate of the dummy file to any of the connected cluster members occurs; and setting N equal to the number of connected cluster members prior to the occurrence of the drop in the transfer rate;

managing the cluster to establish N different groups of open simultaneous connections among N groups of different cluster members; and synchronously deploying the application to the cluster members using the N different groups of open simultaneous connections.

15. The program product of claim 14, where the program code for managing the cluster to establish the N different groups of open simultaneous connections among the N groups of different cluster members comprises program code for:

splitting the cluster members into the N groups of different cluster members, wherein each of the cluster members is in one of the N groups;

generating N deployment tokens, wherein each deployment token comprises the value N and a list of the different cluster members within a different one of the N groups;

opening a plurality of connections, where the plurality of connections comprises an opened connection to a first cluster member in each of the N groups; and sending the deployment token associated with each of the N groups to the first cluster member within each of the N groups via the opened connection to the first cluster member in each group.

16. The program product of claim 15, further comprising program code for:

connecting the cluster members in a tree using the N deployment tokens.

17. The program product of claim 16, further comprising program code for:

synchronously deploying the application to the cluster members in accordance with the tree.

18. The program product of claim 14, wherein the application is deployed between cluster members in a memory to memory fashion.

19. The program product of claim 14, further comprising program code for:

receiving a ready message from each cluster member indicating that an opened connection has been successfully established for each cluster member; and where the program code for synchronously deploying the application to the cluster members using the N different groups of open simultaneous connections comprises program code for synchronously deploying the application to the cluster members using the N different groups of open simultaneous connections in response to receiving the ready message from each cluster member.

20. The program product of claim 19, where the program code for sending the deployment token associated with each of the N groups to the first cluster member within each of the N groups via the opened connection to the first cluster member in each group comprises program code for causing, in response to receiving one of the N deployment tokens, each of the first cluster member within each of the N groups to:

remove the first cluster member from the list of the different cluster members in the group;

split remaining cluster members of the list of the different cluster members in the group into N new groups;

generate N new deployment tokens, wherein each new deployment token comprises the value N and a list of the remaining cluster members within a different one of the N new groups;

open an additional plurality of connections as part of the N different groups of open simultaneous connections, where the additional plurality of connections comprises an opened connection to a first cluster member in each of the N new groups; and send the new deployment token associated with each of the N new groups to the first cluster member within each of the N new groups via one connection of the N different groups of open simultaneous connections to connect the cluster members in a tree using the N new deployment tokens.

* * * * *